United States Patent [19]
Tava et al.

[11] 4,092,523
[45] May 30, 1978

[54] CONVERSION CALCULATOR

[76] Inventors: Paul Tava, 45 Vassar La., Hicksville, N.Y. 11801; Steven S. Herrick, 2204 Clapboard Hill Rd., Little Rock, Ark. 72207

[21] Appl. No.: 714,590
[22] Filed: Aug. 16, 1976
[51] Int. Cl.² .............................................. G06F 3/02
[52] U.S. Cl. ............................ 235/310; 340/347 DD; 364/710; 364/709
[58] Field of Search ...................... 235/154, 155, 156; 340/347 DD, 172.5

[56] References Cited
U.S. PATENT DOCUMENTS

| | | | |
|---|---|---|---|
| 3,402,285 | 9/1968 | Wang | 235/154 |
| 3,748,450 | 7/1973 | Fico | 235/155 |
| 3,775,601 | 11/1973 | Hatano | 235/156 |
| 3,816,731 | 6/1974 | Jennings | 235/156 |
| 3,855,459 | 12/1974 | Hakata | 340/347 DD |
| 3,973,113 | 8/1976 | Goldsamt | 235/154 |
| 4,001,569 | 1/1977 | Dickinson | 235/155 |

Primary Examiner—Charles D. Miller
Attorney, Agent, or Firm—Dressler, Goldsmith, Clement, Gordon & Shore, Ltd.

[57] ABSTRACT

Electronic calculator for automatically converting numerical data representative of a valve expressed in an initial one of a plurality of variably related units to numerical data representative of the same value expressed in any other one of said plurality of variably related units and for storing factors used in said conversions.

13 Claims, 4 Drawing Figures

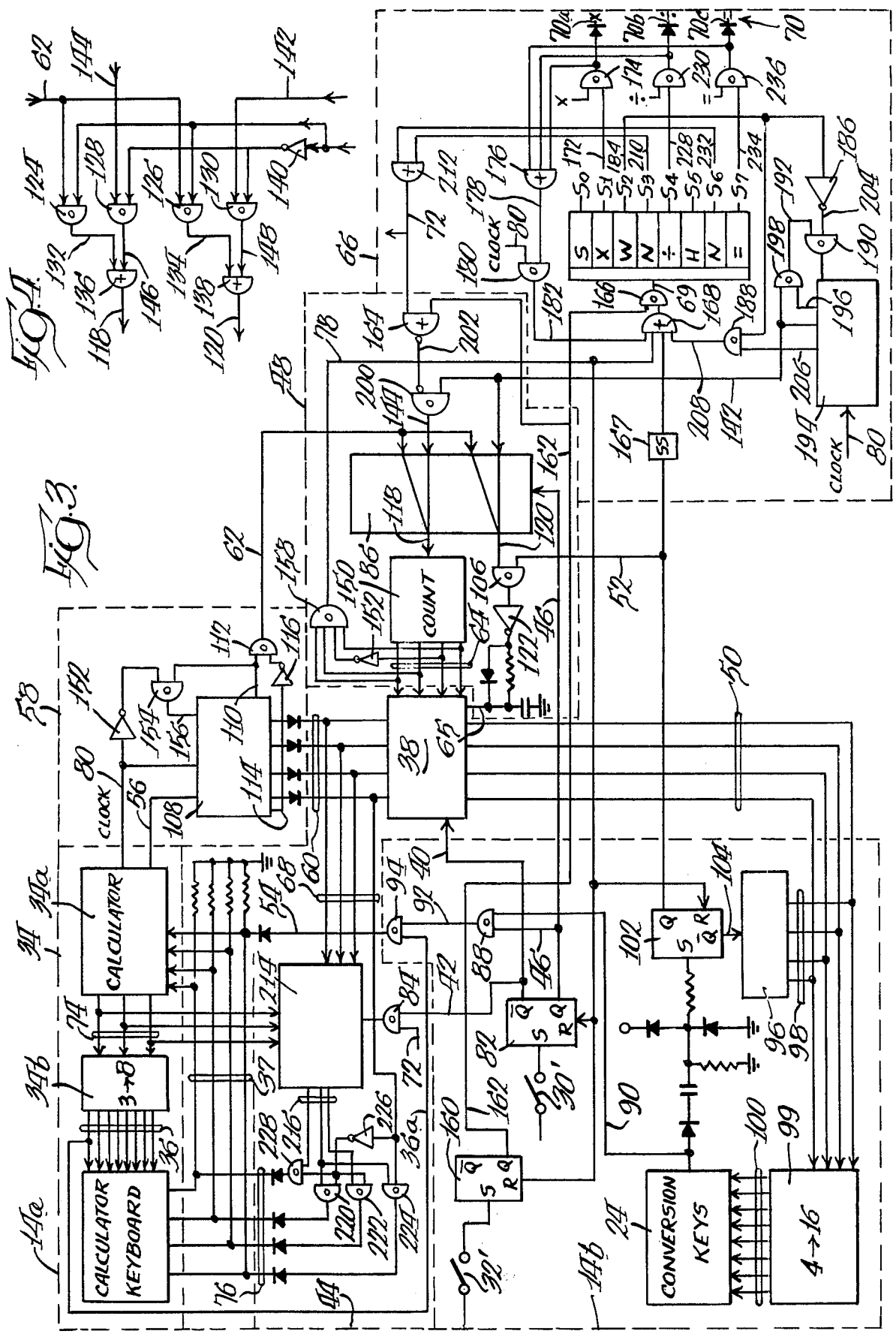

CONVERSION CALCULATOR

BACKGROUND OF THE INVENTION

The present invention relates to calculators capable of converting values expressed in any one of a plurality of variably related units to any other one of the plurality of such related units.

The development of the hand-held and desk top calculator has expanded the horizons for performing a variety of calculations easily and relatively inexpensively. The variety of such calculators in existence, the rapidity of change and the increase in the capability of these calculators is too well known to require comment. Not only has the capability of such calculators increased at what seems like an exponential rate, but the cost to the consumer has decreased almost as rapidly.

One type of calculator that has become very popular, at least in the United States, is one having the capability to provide conversion between the English or U.S. system of measurement and the metric system. Typically, a single key stroke provides conversions between two specific units, e.g., between inches and millimeters, feet and meters, gallons and liters, pounds and killograms, ° F and ° C and others. A variety of calculators with this capability exist, such as the Hewlett Packard Model HP-55.

In spite of the convenience of such calculators stemming from this type of conversion capability, there are limitations because each conversion is limited to two specific units. In addition, metric and other similar conversions involve fixed relationships. Clearly, any type of conversion problem in which the factors may not remain constant could not suitably utilize this approach.

One clear example of this type of problem is in the field of international finance which involves almost continuous conversion from one currency to another. Since the value of currencies relative to each other vary from day to day, the rigid type of conversion techniques described above cannot be used.

Even those calculators which are designed to provide more flexibility in conversions by allowing the user to select the base from which the conversions are to be made are limited to this capability. One more flexible conversion approach, the Rockwell A4521MOS-LSI calculator circuit, allows the selection of the base unit from which conversions are to be made and permits English-metric conversions from a selected base unit to a number of other related units of length, including area volume, fluid, mass and temperature units. This approach is still limited in that it provides preset fixed relationship conversions from a selected unit within a system to some other units within that system. Since this calculator is limited to conversion between preselected units having a fixed relationship, the number of units available for conversion is usually limited, and multiple conversions between units having a varying relationship to each other is not possible.

SUMMARY OF THE INVENTION

In accordance with the present invention there is provided a calculator capable of simply and directly converting a value expressed in any one of a plurality of variably related units to any other one of the plurality of such units.

In accordance with the present invention, conversion of a value expressed in any one of a plurality of variably related units to any other of the plurality of variably related units is accomplished simply by the sequential actuation of two keys, the first key identifying the units in which a displayed number is expressed and from which conversion is to be made, and the second key identifying the units into which the number is to be converted. The conversion calculator incorporating the present invention is capable of storing a plurality of factors which express a relationship between each of the units and a common unit at each of a plurality of addresses in an addressable memory, each address being at least partially defined by a corresponding conversion key.

Utilizing these stored factors, a displayed number, one keyed into the calculator, is expressed in one of the related units having factors stored in the memory by actuation of one of the keys, and is converted to any other of the related units by actuation of a second conversion key identifying the other unit.

More specifically, a calculator incorporating the present invention responds to actuation of a first conversion key to initiate a chain calculation required to convert from the units identified by the first key to any of the other units identified on the conversion keyboard and for which factors are stored in the addressable memory. Actuation of a second key completes the calculation and effects display of the result in units identified by the second key.

Actuation of the first conversion key initiates a sequence in which actuation of an arithmetic key is simulated to enable the calculator in that arithmetic mode, a factor is read out of memory and actuation of a second arithmetic key is simulated to perform the previous arithmetic operation and to enable the calculator in the second arithmetic mode. The display at this point may reflect conversion of the original units identified by the first key depressed into a common one of the plurality of units. Upon actuation of the second conversion key, the appropriate factor for conversion into units identified by the second key is recalled from memory and actuation of the appropriate arithmetic keys for completing the calculation are simulated to produce the final conversion answer.

Thus, in accordance with the present invention, conversion from any one of a plurality of designated related units to any other of the plurality of designated units may be effected simply by sequential actuation of two conversion keys. This simplified operation eliminates necessity to repetitively key in conversion factors, eliminates necessity to continuously look up conversion factors and tables, and automatically performs the appropriate calculations in the proper order as required thereby eliminating concern about the necessity to determine whether the appropriate conversion factors should be inverted and whether or not it is necessary to multiply, divide or perform whatever other calculation may be necessary to accomplish the conversion.

A calculator incorporating the present invention also provides the capability to conveniently alter the factors stored in the addressable memory to accommodate changing relationships. When conversion is not required, the addressable memory provides an expanded memory capability not found in most calculators.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

BRIEF DESCRIPTION OF THE DRAWING

FIG. 3 is a more detailed logic diagram of the present invention; and

FIG. 4 is a logic diagram of one component shown in FIG. 3.

DESCRIPTION OF SPECIFIC EMBODIMENT

Figure 1:
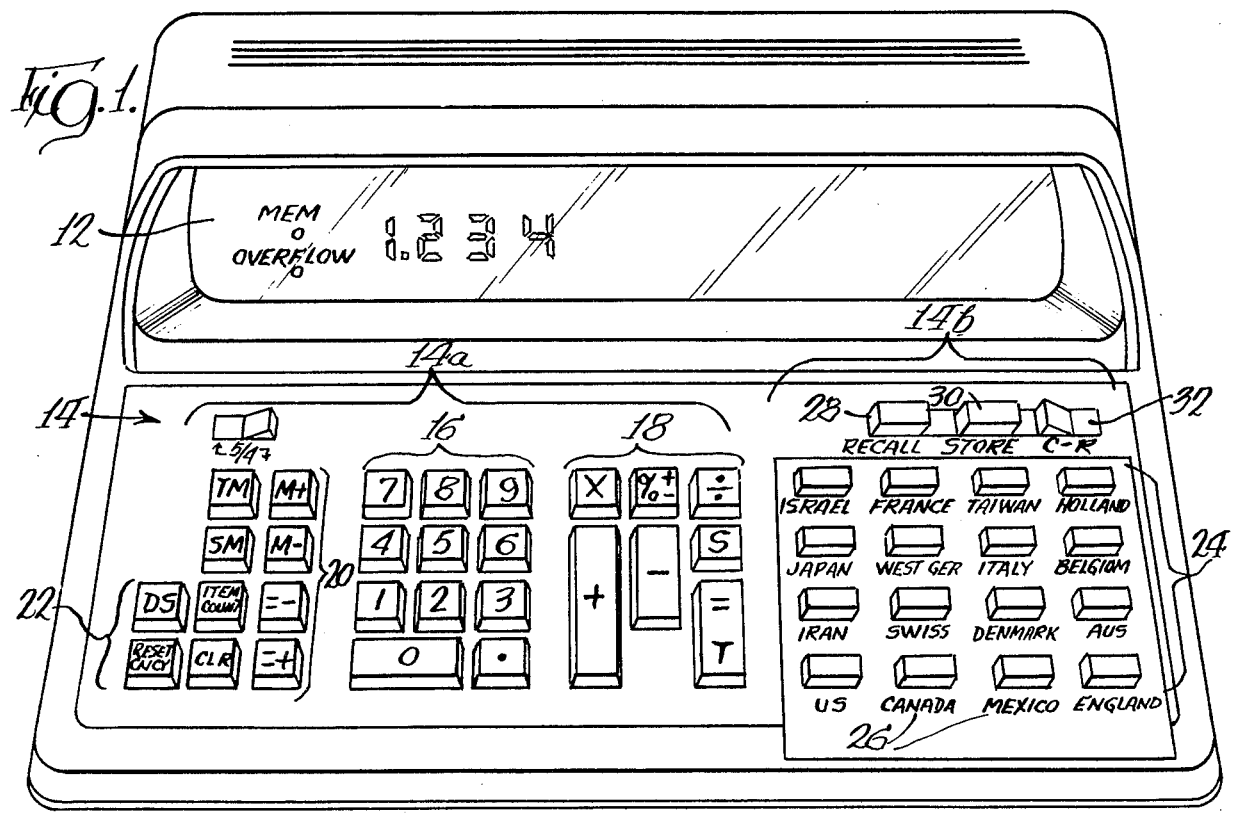
FIG. 1 is a perspective view of one embodiment of a calculator incorporating the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

A conversion calculator 10 incorporating the present invention may utilize any of a number of basic calculator arrangements. The calculator shown in FIG. 1 is a display type calculator, as distinguished from a printing calculator, having an optical display 12 and a keyboard 14 including keys making up one type of standard calculator keyboard 14a and keys making up the conversion keyboard 14b having specific application to the present invention.

The standard keyboard includes data keys 16, arithmetic operation keys 18, memory operation keys 20, and clear and other auxiliary keys 22. This keyboard and the calculator circuitry associated therewith does not form part of the present invention except insofar as numerical data required is entered by use of the data keys 16 and the calculator circuitry is utilized to perform the necessary calculations. While the standard keyboard shown incorporates single function keys, keys utilized in many keyboards can have multiple functions; and it is to be understood that the present invention is not limited to the use of single function keys for the standard keyboard or for the conversion keyboard. For the sake of simplicity, however, the disclosed embodiment will be illustratively described with reference to single function keys.

The conversion keyboard 14b includes a plurality of conversion keys 24, each of which identifies a separate one of a plurality of related units. For purposes of illustration, the present invention will be described with respect to units of currency. When used for currency conversion, each of the conversion keys 24 is identified by a legend 26 which identifies a given currency. The conversion keyboard 14b also includes conversion function or mode select keys — a recall key 28, a store key 30, and an automatic convert/recall switch 32.

Figure 2:
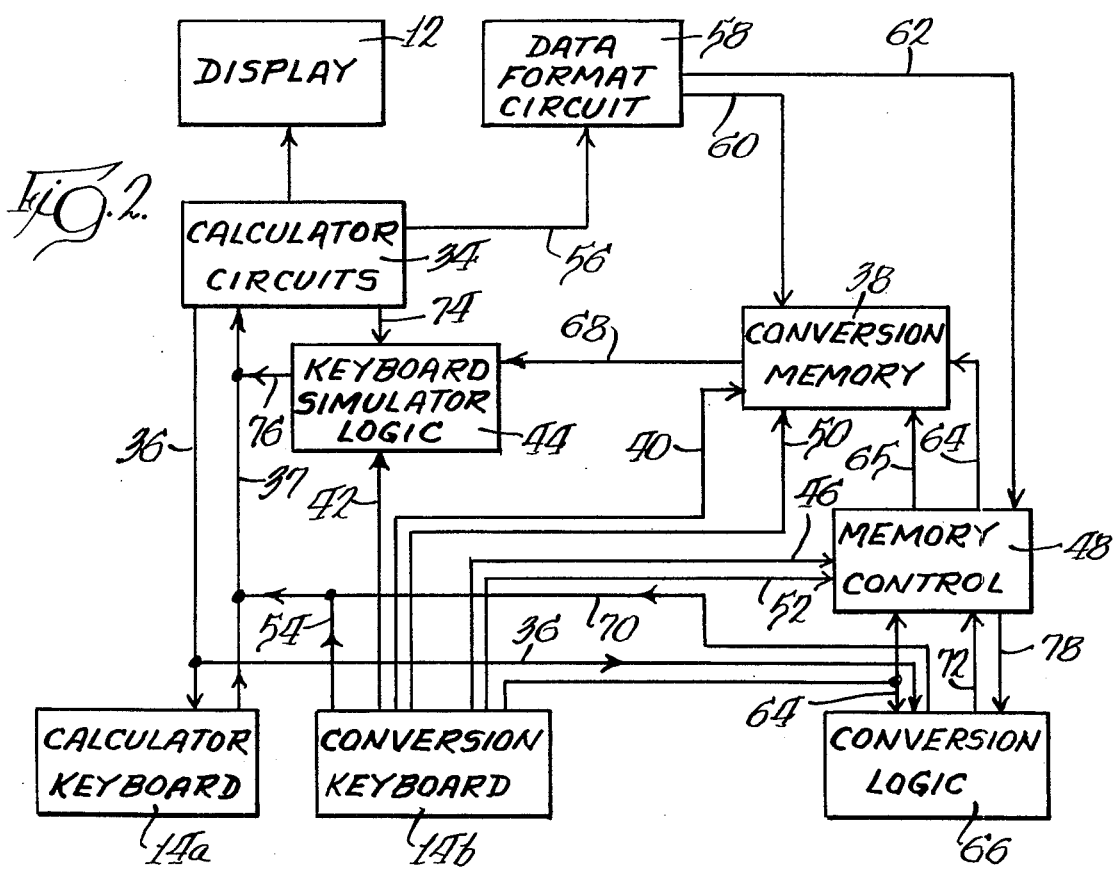
FIG. 2 is a general block diagram of the present invention.

Referring to FIG. 2, actual calculations are performed in standard calculator circuit 34 typically embodied in one or more integrated circuit chips. When used for performing functions associated with the calculator alone, the calculator is operated in the usual way. One calculator circuit suitable for use with the present invention is the Rockwell International one-chip printing/display calculator MOS/LSI device A5700. (See, Rockwell International's product bulletin dated August, 1975, for Rockwell Calculator Circuit A5700, Model 310 (RX) Printer/Display Calculator.) Since the design and capabilities of the calculator circuitry form no part of the present invention, the operation and capabilities of the calculating circuit will not be described except insofar as is necessary to facilitate understanding of the present invention.

As is well known, the calculator circuitry 34 incorporates its own internal clock to synchronize the various operations. Under control of the clock, the calculator 34 produces keyboard scanning signals on one of a plurality of lines 36. When a key of the calculator keyboard 14a is actuated, the scanning signal is applied to the calculator 34 as one of a plurality of keyboard outputs 37. The calculator 24 identifies the key actuated and operates accordingly.

When a conversion factor or other data is to be stored in the conversion memory 38, the data to be stored is that data displayed in display 12. Storage of this factor in the conversion memory 38 is initiated by depressing or actuating the store key 30 of the conversion keyboard 14b. Actuation of store key 30 applies a store or write enable signal 40 to the conversion memory 38 to enable the memory 38 to store data at enabled addresses, applies an inhibit signal 42 to the keyboard simulator logic circuit 44 to inhibit operation of that circuit, and applies a timing control signal 46 to a memory control circuit 48 to render selection timing under the direct control of the calculator 34 as data is read out of the calculator 34.

Storage of data in the conversion memory 38 is initiated by actuation of one of the conversion keys 24. Actuation of a conversion key 24 effects application of an address selection signal 50, determined by the particular conversion key 24 that is actuated, to the conversion memory 38. The address selection signal 50 enables a number of specified addresses within the conversion memory 38 all corresponding to the actuated conversion key.

Simultaneously, a memory control signal 52 is applied to the memory control circuit 48, and a data read out signal 54 is applied to the calculator circuit 34 in conjunction with a corresponding scan signal 36 to cause the data displayed in display 12 to be serially read out on calculator output line 56. Output line 56, in the illustrated embodiment, is the output line reserved for a printing mechanism which, in the illustrated embodiment, is not otherwise utilized.

The data displayed in display 12 are read out serially bit by bit and character by character. Since the conversion memory is designed to receive data for each character, i.e., each number of symbol in parallel, the data format circuit 58 converts the serially received data for each character into a parallel output format. When all of the data for a character have been applied to the data format circuit 58, the data output 60 of the format circuit contains all the data representative of that character.

At that time, an address control pulse 62 is applied to the memory control circuit 48 which responds by producing a secondary address signal 64 to define in conjunction with address signal 50 the complete address at which the data 60 for the particular character is to be stored. The memory control circuit also responds to the address signal 62 and to the control signal 52 to produce a memory enable signal 65 to enable the memory 38 to receive the data on line 60.

As each character in the calculator 34 is read into the format circuit 58, succeeding address control pulses 62 cause the memory control 48 to alter the secondary address signal 64 thereby storing successive characters at different addresses within the conversion memory 38. Thus, the address for the data stored in the conversion memory is determined in part by the particular conversion key 24 which is actuated and in part by the address control pulses 62 which are used to represent the position of each character stored in the conversion memory 38.

Conversion of numerical data is initiated by positioning the conversion-recall switch 32 in the conversion position. In this position, the signal 46 applied to the memory control circuit 48 renders it responsive to timing pulses produced in the conversion logic circuit 66. Since the store switch has been reset, the keyboard simulator logic is enabled and is responsive to each character recalled from memory on memory output lines 68 to simulate actuation of a corresponding data key 16 on the calculator keyboard 14a to effect read in of that data into the calculator 34.

With the conversion switch 32 in the convert position, actuation of one of the conversion keys 24 again produces an address selection signal 50 as well as the control signal 52 from which a conversion signal 69 is produced and applied to the conversion logic circuit 66. The conversion logic circuit 66 responds to the conversion signal 69 to initiate the conversion sequence.

In the illustrated embodiment, the conversion sequence involves an initial multiplication of the number stored in the calculator 34 by the conversion factor selected by the conversion key 24 initially actuated and a division of that product by a conversion factor selected by the second conversion key 24 that is actuated. The result is a number having a value in units corresponding to the second key actuated equal in value to the number originally displayed in the calculator expressed in the units of the first key.

The conversion logic circuit 66 responds to the conversion signal 69 and to the scan signals 36 to produce simulated operational control signals 70. The initial operational control signal is a multiply signal produced in response to the scan signal 36 for the multiply key on keyboard 14a, which enables the calculator 34 in the multiply mode. The conversion logic circuit 66 then produces a memory recall signal 72 causing the memory control circuit 48 to recall from conversion memory 38 the numerical data comprising the conversion factor corresponding to the conversion key 24 that was actuated, as reflected by the address signals 50 and 64.

The output 68 of the conversion memory 38, the data being recalled, is applied to the keyboard simulator logic 44 which also receives coded scanning signals 74 from the calculator 34. The keyboard simulator logic 44 includes a comparator which produces an output 76 to simulate actuation of a key corresponding to the symbol or number read out of the conversion memory 38. The output 76 is applied to the appropriate calculator input line 37 to simulate actuation of the data key corresponding to the data 74 being read out of memory.

When the conversion factor has been read out of the conversion memory 38 and into the calculator 34, an advance signal 78 is applied to the conversion logic circuit 66, which produces a divide operational control signal 70 in response to the divide scanning signal 36. This causes the calculator 34 to multiply the data originally displayed by the conversion factor just read out of conversion memory 38 and enables the calculator 34 in the divide mode.

An actuation of the second conversion key 24, an address selection signal 50 corresponding thereto is applied to conversion memory 38 and the conversion logic circuit 66 produces the memory recall signal 72 to select the balance of the address for reading out the second conversion factor from the memory 38. When this second factor has been read out of conversion memory 38 and into the calculator 34, the conversion advance signal 78 is produced, and the conversion logic 66 produces an equal signal 70 to complete the mathematical operations and to cause the calculator 34 to display the result.

Referring to FIG. 3, there is shown a more detailed logic diagram of that portion of the conversion calculator incorporating the present invention. The calculator circuit 34 includes the calculator logic circuits 34a and a three to eight conversion circuit 34b for producing the keyboard scanning signals 36. The coded scanning signals 74 of the calculator logic circuit 34a is a three bit coded signal which is applied to the converter 34b. The converter 34b sequentially produces a scanning signal on each of the output lines 36 for each coded signal 73 applied to the input of the converter 34b.

Each of the scanning signals 36 scans four keys of keyboard 14a, each connected to a different one of the keyboard output lines 37. Thus, a key that is actuated is identified by the line 37 on which a signal appears together with the then existing coded signal 74. The calculator logic circuitry 34a evaluates this combination of signals to identify the key that is actuated.

In addition, as indicated above, all timing for calculating operations within the calculator circuitry 34a is controlled by an internal chock (not shown). The calculator 34a also produces a clock output 80 which is utilized to control operation of several of the components shown in FIG. 3 as will be explained below.

When data is to be stored in the conversion memory 38, the store key 30 is actuated to close switch 30', thereby applying a signal to the set input of a store flip flop 82. The $\overline{Q}$ output of the store flip flop 82, which goes low when the flip flop is set, produces the memory write enable signal 40 and the inhibit signal 42. Since the output $\overline{Q}$ goes low, the inhibit signal 42 which is applied to a keyboard simulate logic enable AND gate 84 precludes any output from the AND gate 84 thereby insuring that the keyboard simulator logic circuit 44 is disabled.

The Q output of the store flip flop 82 is the timing control signal 46 which is applied to the control input of an address timing circuit 86 which forms part of the memory control circuit 48. The Q output 46 of the store flip flop 82 is also applied to one input of a first data read out enabling AND gate 88 which receives its other input 90 upon actuation of one of the conversion keys 24.

When the store switch 30' is closed and one of the conversion keys 24 is actuated, the output 92 of the enabling AND gate 88 goes high. The output 92 is applied to one input of a second data read out AND gate 94 the output which is the data read out signal 54. The other input to AND gate 94 is one of the scan signals 36a which is the one that scans what would be a print key. The data read out signal 54 is applied to one of the keyboard output lines 37 corresponding to what would be the print key to instruct the calculator circuitry 34a to produce data output on line 56.

The address selection signal 50 is determined by a conversion address counter 96 which produces at its output 98 a 4 bit coded signal. The output 98 is applied to a 4 to 16 converter 99 which converts the binary coded 4 bit output 98 to produce conversion key scanning signals 100 sequentially on each of 16 lines. When the coded output 98 of the conversion address counter 96 produces a signal on the scanning line 100 corresponding to the conversion key 24 that is actuated, the conversion keyboard output 90 is produced.

The keyboard output 90 is also applied to the set input of the conversion address flip flop 102. The $\overline{Q}$ output 104 of the conversion address flip flop 102 goes low when that flip flop is set to stop the conversion address counter at the selected address, thereby producing a four bit coded address signal 50. The Q output of the conversion address flip flop 102 is the memory control signal 52 which is applied to one input of a memory enable AND gate 106. When the second input to the memory enable AND gate 106 goes high the memory enable signal 65 goes low to enable the conversion memory 38 to store data appearing at the output 60 of the data format circuit 58.

The remaining portion of the address at which data is to be stored in conversion memory 38 is determined by the memory control circuit 48. The data output 56 of calculator circuit 34 is a serial 6 bit code with the first and last bits being control bits and the middle 4 bits being data bits for each character being serially read out of the calculator 34. Data output 56 is read serially into a serial to parallel converter which takes the form of a format shift register 108. Each bit is read into the shift register in response to clock pulses 80 applied to the shift input of register 108.

When the data for each character is properly positioned within shift register 108, the control bit in the last stage of the shift register will be a "1" and the control bit in the first stage of the shift register will be a "0." The output 110 of the last stage of shift register 108 is applied as one input to an address control AND gate 112. The output 114 of the first stage is also applied to the AND gate 112 through inverter 116. The coincidence of these signals produces the address control pulses 62, the output of address control AND gate 112.

The address control pulses 62 are applied to the input of the address timing control circuit 86. Each pulse 62 produces a pair of outputs, secondary address selection output 118 and memory enable output 120. The memory enable output 120 together with the memory control signal 52 are the two inputs to memory enable AND gate 106 the output of which is applied through an inverter 122 to produce the memory enable signal 65.

FIG. 4 shows in more detail the address timing control circuit 86. This circuit includes four two input AND gates 124, 126, 128 and 130. The address control pulses 62 are applied to one input of AND gate 124 and AND gate 126. The other input to AND gates 124, 126 is timing control signal 46. Upon simultaneous occurrence of the timing control signal 46 and an address control pulse 62, each of AND gates 124, 126 produces an output 132, 134, respectively. The output 132 of AND gate 124 is applied to one input of an OR gate 138 the output of which is the memory enable output 120.

Thus, during the store mode, the outputs 118 and 120 are controlled by and produced in response to address control pulses 62 during the presence of timing control signal 46.

During conversion and recall of data from the memory 38, a timing control signal is not produced thereby precluding outputs from the AND gates 124 and 126. However, the absence of timing control signal 46 produces an inverse timing control signal 46' the output of an inverter 140. The timing control signal 46' is applied as one output to and AND gates 128, 130. The other input to these AND gates are recall address control pulses 142, 144 produced as described below. The pulse 142 is applied as a second input to AND gate 130 and the pulse 14-1 is applied as second input to AND gate 128. The simultaneous occurrence of pulses 144 and timing signal 46' results in an output 146 of AND gate 128 which is applied to a second input of OR gate 136 to produce the secondary address selection output 118. The simultaneous occurrence of pulses 142 and timing control signal 46' produces an output 148 from AND gate 130 which is applied as an input to OR gate 138 to produce the enable output 120.

Turning to FIG. 3, since a timing control signal 46 has been produced as a result of actuation of store key 30', the occurrence of an address control pulse 62 results in the production of the secondary address selection output 118 and the memory enable output 120. The address selection output 118 is applied as a count input to an address counter 150 which produces a four bit binary coded secondary address signal 65.

In the illustrated embodiment, the calculator 34 has a twelve character maximum capacity and therefore it is only necessary to provide for storage of twelve characters in the conversion memory 38. These characters are stored at addresses corresponding to secondary address signal 64 assuming binary coded values of 1–13. When the first secondary address selection output 118 is applied to the address counter 150, the secondary address signal 64 advances to a binary coded signal representative of address "0001." Immediately thereafter, the memory enable signal 65 is produced to store the data output 60 at the corresponding address within the memory 38 as defined by the address signal 50 and the secondary address signal 64.

When the clock pulse 80 then existing terminates, the output 149 of an inverter 152 to which the clock pulse 80 is applied goes high and is applied to a reset AND gate 154, the other input of which is the output 10 of the last stage of format shift register 108. The resulting reset output 156 of AND gate 154 resets the format shift register 108 thereby terminating the address control pulse 62.

Date on line 56 continues to be read into the shift register 108 in response to the application of clock pulses 80 to the shift input of the shift register 108. The next store address control pulse 62 results in the production of another secondary address selection output 118 and enable output 120 to advance the address counter 150, and to produce a memory enable signal 65 for storing the next character at the new address in memory 38.

When the last character or symbol has been stored in conversion memory 38, the address signal 64 will be the binary coded equivalent of 13 (1101). As a result, all of the feedback inputs to feedback AND gate 158 will go high to produce the reset output 78. The reset output 78 resets counter 150, and is applied to the reset inputs of store flip flop 82 and conversion address flip flop 102. Data having been stored at selected addresses within conversion memory 38, the system is reset.

For initiating conversion of data in calculator 34a, reflected by the data displayed in display 12, the conversion recall switch 32 is placed in the convert mode which closes switch 32' in FIG. 3. This applies a signal to the set input of the convert flip flop 160 to produce a conversion enable signal 162 at the Q output of conversion flip flop 160. The conversion enable signal 162 is applied to one input of the memory control circuit input NOR gate 164 and to one input of conversion logic input AND gate 166. When a conversion key 24 is depressed, an address control signal 50 is produced, as described above, as is the output 90. However, since the timing control signal 46 which is the second input to the first data read out AND gate 88 is low, the output of AND gate 88 is low and no data read out signal 54 can be produced.

The output 52 of conversion flip flop 102 is again applied to one input of memory enable AND gate 106 and to one input of a single shot 167. The output of single shot 167 is applied to conversion logic input OR gate 168, the output of which is the second input to the input AND gate 166. The output of the input AND gate 166 is the conversion signal 69 which is applied to the shift input of a conversion control eight stage shift register 170.

When the conversion control shift register is reset, it is in start position S0, the neutral position. Each time it receives a conversion signal 66 the shift register 170 advances to produce an output from the next stage. In response to the first conversion signal 66, the shift register 170 is shifted to produce an output 172 from its second stage S1. The output 172 is one input to a multiply simulate AND gate 174. The other input to the multiply simulate AND gate 174 is that scanning signal 36x which scans the multiply key of keyboard 14a. With both inputs applied to multiply simulate AND gate 174, a multiply output 70a is produced and is applied to that one of the keyboard output lines 37 to produce in conjunction with the coded scan signal 73 a signal which simulates actuation of the multiply key.

The calculator is thus enabled and performs whatever manipulations it would do in response to the actuation of the multiply key.

The output 70a of the multiply simulate AND gate 174 is also applied to the conversion feedback OR gate 176. The output 178 of the feedback OR gate 176 is applied as one input to a feedback AND gate 180, the other input of which are the clock pulses 80. An output 182 of the feedback AND gate 180 is produced in response to the next occurring clock pulse 80 after application of the feedback signal 178 to the other input of the AND gate 180. This signal is applied through input OR gate 168 and input AND gate 166 to the shift register 170 to advance that register to the S2 stage.

Since the multiplication enabling operation may require a "relatively long" period of time, the S2 or wait stage provides a delay before a number is recalled from the conversion memory 38. The output 184 of the S2 state is applied to the input of a timing control inverter 186 and to one input of a second feedback AND gate 188. The output of the inverter 186 is applied to slow time counter reset AND gate 190. The output 192 of the reset AND gate 190 resets a slow time counter 194. Clock pulses 80 are applied to the count input of the counter 194 which advances one count for each clock pulse received. The counter 194 produces a binary coded output representative of the number of clock pulses received, since it was reset. In one illustrated embodiment, the counter 194 is a 14 stage counter in which output 196 from the first or lowest order stage is applied at one input to a recirculating AND gate 198. An output 142 from a higher order stage, for example, the eighth stage is also applied to the recirculating AND gate. This output 142 is also one of the recall address control inputs to the address timing control circuit 86, and one of the inputs to a timing control input AND gate 200.

The other input to AND gate 200 is an inhibit input which is the output 202 of the input NOR gate 164. Thus, in the illustrated embodiment, counter 194 is normally reset at count 129, i.e., when an output signal is produced from both the first and eighth stages to produce an output 204 from AND gate 198. The output 198 is applied as the second input to reset AND gate 200 which in conjunction with the inverted output 204 of inverter 186 causes a reset signal 192 to be applied to the counter 194.

When the conversion control shift register 170 is in its S2 state, the output 184 from the S2 stage causes the output of converter 186 to go low thereby inhibiting the production of the reset signal 192. The slow time counter 194 continues to advance until it counts sufficient clock pulses (8192) to produce an output 206 at its fourteenth state which in conjunction with S2 output 184 causes the output 208 of AND gate 188 to go high and produce the next conversion signal 66, to advance the shift register 170. The shift register now shifts into its fourth or S3 stage terminating output 184 and allowing the slow time counter 194 to be reset the next time the eighth stage output 142 and first stage output 196 both go high.

When the conversion control shift register 170 is shifted to the fourth or S3 stage, the S3 output 210 is produced. This output is applied to OR gate 212 of memory recall signal 72. Memory recall signal 72 is applied to the second input of NOR gate 164 which because the other input 162 is also high results in the output 202 of NOR gate 164 going low. Since the output 202 of NOR gate 164 is applied to an inhibit input if AND gate 200, the next time that the eighth stage output 142 to the slow time counter 194 goes high, the inputs 140 and 142 of the address timing control circuit go high to produce the secondary address selection output 118 and the memory enable output 120. This enables the memory 38 to read out the data stored at the addresses defined by the address signals 50 and 64 onto the output lines 74 which are applied to the input of the keyboard simulator logic 44. The keyboard simulator logic circuit is enabled since the Q̄ output 42 of the store flip flop 82 is high and since the memory recall signal 72, the other input to AND gate 84 is also high.

The keyboard simulator logic circuit 44 includes a comparator 214 which produces an output 216 when the coded scan signal 73 and the memory output signal 74 are the same. The output 216 of comparator 214 is the same as would have occurred if the data key corresponding to the data read out from memory 38 were actuated. The calculator thus reads in the data corresponding to the numbers stored in the conversion memory.

The three outputs 216 of the comparator 212 are each connected to a different one of simulator output AND gates 216, 218, 220 and 222. The fourth output line 74 of conversion memory 38 is connected directly to the fourth output AND gate 224 and to the other output AND gates 218, 220 and 222 through an inverter 226. Thus, and since the simulator must simulate 11 possible keys, when an output appears on the fourth line 74, the outputs of AND gates 218, 220 and 222 are held low by the output of inverter 226 and the output of AND gate 224 goes high when both its inputs go high.

When all of the data stored at the addresses defined by address signals 50 and 64 have been read out of conversion memory 38, through the data keyboard simulating circuit 44 and into the calculator 34, the address signal 64 produces a reset signal 78 which, as described above, resets counter 148 and is applied through OR gate 168 and AND gate 166 to the conversion control shift register 170 to advance it to the next stage. The reset signal 78 is also applied to the reset inputs of the conversion flip flop 160 and the convert address flip flop 102. Only flip flop 102 is reset since switch 32' remains closed.

When the conversion shift register 170 is advanced, an output 228 from the S4 stage is applied to the divide simulate AND gate 230 the other input of which is that scanning signal 36y which scans the divide key of keyboard 14a. A divide signal 70b is produced to implement the calculator in the previously enabled multiply mode and to enable it in the divide mode. The divide simulate signal 70b is also applied to OR gate 176 to produce signal 178 applied to AND gate 180 to produce the feedback signal 182 to advance the shift register to the next or S5 stage.

At this point, since there is no output from stage S5 the system is in a hold or rest position awaiting actuation of the next conversion key 24. When the next conversion key 14 is actuated, an address signal 50 is produced corresponding thereto, a memory enable signal 52 is produced and a conversion signal 66 is produced all as described above. The conversion control shift register 170 advances to its next stage, the S6 stage to produce an S6 output 232 to initiate recall of data from memory 38, as described above. The S6 output 232 is applied to OR gate 212 to produce the memory recall signal 72 causing the data stored at the address within memory 38 defined by address signals 50 and 64 to be recalled from memory 38. When the data is recalled from memory 38, the reset signal 78 is produced advancing the conversion shift register to its S7 or last stage. The S7 output 234 is applied to the equal simulator AND gate 236. The second input to AND gate 236 is the scan signal 37 which scans the equal key. The equal simulating signal 70c that is produced is applied to the calculator 34a to complete the necessary calculation and display the final answer. The output 70c is also applied through OR gate 176, and AND gate 180 to reset the shift register 170.

Thus there has been disclosed a conversion calculator for converting data representative of values expressed in one of a plurality of variably related units having the same value in another of said plurality of units simply by the successive and sequential actuation of conversion keys representative of the units involved in the conversion. The calculator of the present invention also provides for storage of factors used in the conversion, so changes in the relationship between units can be accommodated.

In one example, conversion factors stored will be the ratio of one of the units represented by the conversion keys to the other units. For currency conversion in the United States, for example, the data most frequently available is data for conversion of foreign currency into U.S. dollars, the factor by which one dollar must be multiplied to convert it into a foreign currency. Thus, in connection with the U.S. dollar conversion key, the factor stored would of course be 1. The conversion factors for each of the other currencies with respect to the dollar is conveniently available and although changing frequently may be readily obtained and stored at the appropriate address in the conversion memory. With the data stored in the conversion memory, conversion from any one currency to any other currencies occurs simply by actuation of the conversion key corresponding to the first currency and immediately followed by actuation of the key corresponding to the currency to which it is desired to make the conversion.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. An electronic calculator for automatically converting numerical data representative of a value expressed in an initial one of a plurality of variably related units to numerical data representative of the same value expressed in any other one of said plurality of variably related units comprising:

calculating circuit means for performing calculations on numerical data in accordance with operational commands and for producing a variety of outputs;

input keyboard means selectively operable to produce inputs for said calculating circuit means representative of numerical data and of operational commands;

addressable memory means for separately storing numerical data at each one of a plurality of different selectable memory addresses;

a plurality of manually actuatable conversion key means, each identifying at least one of said plurality of units and being separately operable to select one of said memory addresses for each of the units identified thereby;

mode selection means manually operable to select a store mode and a convert mode;

means responsive to operation of said mode selection means to select said store mode and to actuation of each one of said conversion key means for reading data out of said calculating circuit means and for storing said data in said addressable memory means at said address selected by said actuated one of said conversion keys; and conversion control means responsive to operation of said mode selection means to select said convert mode and to sequential actuation of any pair of said conversion key means for automatically producing selected operational command signals, for automatically recalling data from the sequentially selected addresses of said memory means, and for effecting applicaion of said operational command signals and of data signals recalled from said memory means to said calculating circuit means to cause said calculating circuit means to perform calculations corresponding to said operational command signals produced by said conversion control means on data initially in said calculating circuit means and on said data recalled from said memory means;

whereby the units in which said data initially in said calculating circuit means are identified automatically by actuation of the first one of said pair of conversion key means and are converted to data having the same value expressed in units identified by actuation of the second one of said pair of conversion key means.

2. A calculator as claimed in claim 1 including:
address selection means responsive to actuation of said conversion key means for producing a memory address selection signal and for applying said memory enabling address selection signal to said memory to select the memory address at which data is to be stored or from which data is to be recalled.

3. A calculator as claimed in claim 2 wherein:
said data read out and storing means includes
means responsive to actuation of one of said conversion key means and to operation of said mode selection means to select said store mode for producing a data read out signal; and
means selectively responsive to said data read out signal for selectively applying said data read out signal to said calculating circuit means for producing data output signals from said calculating circuit means representative of data in said calculating circuit.

4. A calculator as claimed in claim 3 wherein:
said data read out and storing means includes means responsive to said calculating circuit with data output signals for producing a plurality of memory input data signals representative of said data and for applying said memory input data signals to said addressable memory means;
and means responsive to production of said memory input data signals for producing secondary memory address signals and for applying said secondary address signals to said memory means to define in conjunction with said address selection signal a complete memory address at which said data is to be stored.

5. A calculator as claimed in claim 4 wherein:
each of said plurality of memory input data signals is stored at a different one of a plurality of secondary addresses;
said means for producing said secondary address signals producing a different secondary address signal in response to each of said plurality of memory input signals.

6. A calculator as claimed in claim 5 including:
means responsive to storage of the last of said memory input signals for terminating said memory address selection signal and said data read out signal.

7. A calculator as claimed in claim 2 including:
means responsive to operation of said mode selection means to select said convert mode and to actuation of one of said conversion key means for producing an initial conversion signal;
said conversion control means being responsive to said initial conversion signal for producing initial ones of said operational command signals.

8. A calculator as claimed in claim 7 including:
means responsive to said operational command signal for producing another conversion signal;
said conversion control means is responsive to said other conversion signal for producing a data recall signal;
timing means for producing timing signals; and
means forming part of said data read out and storing means responsive to said data recall signal and to said timing signals for producing secondary memory address signals and memory recall signals for applying said secondary address signals to said memory means to define, in conjunction with said address selection signal, a complete memory address from which data is to be recalled, and for applying said memory recall signal to said memory means for recalling data from said defined address.

9. A calculator as claimed in claim 8 wherein:
data is recalled from a plurality of said secondary addresses:
said recall means producing a different secondary address signal and a memory recall signal in response to each of said timing signals.

10. A calculator as claimed in claim 8 including means responsive to the recall of data for said memory means for producing an additional conversion signal;
said conversion control means being responsive to said additional conversion signal for producing additional operational command signals;
said operational command signal responsive means being responsive to said additional operational command signals for producing further conversion signals,
said conversion control means being rendered responsive to a conversion signal produced by actuation of said second one of said pair of conversion key means in response to the last of said further conversion signals.

11. A calculator as claimed in claim 10 wherein:
said conversion control means is responsive to said conversion signal produced in response to actuation of the second one of said pair of conversion key means for producing another data recall signal,
whereby data is recalled from said memory means at the address defined by the address selection signal produced in response to actuation of said second one of said pair of conversion key means and by said secondary address signals as aforesaid.

12. A calculator as claimed in claim 11 wherein:
said additional conversion signal producing means produces a further additional conversion signal in response to the recall of data from said memory means,
said conversion control means being responsive to said further additional conversion signal for producing final operational command signals.

13. A calculator as claimed in claim 12 including:
means responsive to each of said additional conversion signals for terminating the then existing address selection signal.

* * * * *